(12) United States Patent
Kitamura et al.

(10) Patent No.: US 6,892,767 B2
(45) Date of Patent: May 17, 2005

(54) UNCOATED AIR BAG FABRIC

(75) Inventors: Mamoru Kitamura, Ohtsu (JP); Tatsuo Konishi, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 67 days.

(21) Appl. No.: 10/369,788

(22) Filed: Feb. 20, 2003

(65) Prior Publication Data

US 2003/0148683 A1 Aug. 7, 2003

Related U.S. Application Data

(62) Division of application No. 09/616,263, filed on Jul. 14, 2000, now abandoned.

(30) Foreign Application Priority Data

Jul. 19, 1999 (JP) ............................................ 11-204969
Jul. 19, 1999 (JP) ............................................ 11-204975

(51) Int. Cl.$^7$ .............................. B60R 21/16; D03D 1/04
(52) U.S. Cl. ............... 139/387 R; 139/389; 139/420 A; 139/426 R; 280/728.1; 280/730.1; 428/35.2; 428/35.5; 428/229
(58) Field of Search .......................... 139/387 R, 389, 139/420 A, 426 R; 280/728.1, 730; 428/35.2, 35.5, 229

(56) References Cited

U.S. PATENT DOCUMENTS 4,921,735 A     5/1990  Bloch
5,336,538 A  *  8/1994  Kitamura ................... 428/35.2
5,554,424 A     9/1996  Krummheuer et al.
5,581,856 A  * 12/1996  Krummheuer et al. ....... 26/18.5
5,707,711 A  *  1/1998  Kitamura ..................... 428/193
6,000,442 A  * 12/1999  Busgen ........................ 139/389
6,299,965 B1 * 10/2001  Keshavaraj ................. 428/125
6,376,032 B1 *  4/2002  Clarke et al. .............. 428/34.7
6,489,006 B1 * 12/2002  Keshavaraj ................. 428/125
6,770,578 B2 *  8/2004  Veiga ......................... 442/164

FOREIGN PATENT DOCUMENTS

| JP | 01 122752    | 5/1989  |
| JP | 04 002835    | 1/1992  |
| JP | 06 041844    | 2/1994  |
| JP | 08 325888    | 12/1996 |
| JP | 09 291465 A  | 11/1997 |

* cited by examiner

*Primary Examiner*—John J. Calvert
*Assistant Examiner*—Robert Muromoto, Jr.
(74) *Attorney, Agent, or Firm*—Leydig, Voit & Mayer, Ltd.

(57) ABSTRACT

A compact, economical air bag fabric of low air permeability and light mass is realized by a thermoplastic fiber fabric having a distribution of pores formed by the fibers constructing the fabric, that is, the pore distribution of 2.0 or smaller and air permeability of 2.5 L/cm$^2$/min or lower. By setting a permeating deformation index PI of the thermoplastic fiber to 0.1 to 0.6 and the air permeability of the fabric at the differential pressure of 20 kPa to 1.0 (L/cm$^2$/min) or lower, an economical uncoated air bag fabric of which air permeability is low but increases under the high differential pressure condition in the latter period of development is obtained.

24 Claims, No Drawings

UNCOATED AIR BAG FABRIC

CROSS-REFERENCE TO RELATED APPLICATIONS

This patent application is a divisional of U.S. patent application Ser. No. 09/616,263, filed on Jul. 14, 2000, now abandoned.

BACKGROUND OF THE INVENTION

1. Field of the Invention

The present invention relates to a fabric for an uncoated air bag as one of safety devices for a vehicle. More particularly, the invention provides a compact, economical uncoated air bag fabric having low air-permeability while holding necessary mechanical characteristics. The invention also provides a compact air bag fabric of which air-permeability is low but increases at high pressure (40 kpa or higher).

2. Description of the Related Art

In recent years, an air bag of which installation rate has been rapidly increased as one of safety devices of a vehicle protects the driver or occupant in the following manner. When a vehicle crashes, the impact is sensed by a sensor, high-temperature and high-pressure gas is generated from an inflator, and the air bag is rapidly developed by the gas to thereby prevent the driver or occupant's body from being jumped out by the impact so that especially his/her head does not collides with the driving wheel, front glass, door glass, and the like.

Hitherto, a base fabric coated with a synthetic rubber such as polychloroprene, chlorosulfonated polyolefine, or silicone rubber is used for an air bag since it has high heat resistance, high air shutoff performance (low permeability) and high non flammability.

The coated base fabrics are, however, heavy and do not have satisfactory flexibility. The manufacturing cost is high and the base fabrics are not recyclable. Therefore, the base fabrics have such drawbacks when each of them is used as a base fabric for an air bag.

Although the drawbacks have been largely improved in a silicone rubber coated base fabric which is still presently used, the fabric is not yet satisfactory.

Recently, an uncoated air bag using an uncoated base fabric for an uncoated air bag is mainstream and the following techniques have been proposed for lighter weight, more preferable foldability and lower permeability.

(1) Method of obtaining light base fabric of low air permeability by performing a shrinking process and a calender process after very compact fabric is woven (Japanese Unexamined Patent Publication No. 1-122752).

(2) Method of obtaining a light base fabric of low permeability of 0.5 cc/cm²/s or lower at differential pressure of 124 Pa by performing a calender procession both sides of the base fabric (Japanese Unexamined Patent Publication No. 4-2835).

(3) Method of obtaining a base fabric of low permeability by performing a chemical shrinking process on the fabric to thereby swell yarn constructing the fabric (Japanese Unexamined Patent Publication No. 6-41844).

(4) Method of mixing a thermoplastic synthetic fiber A having single yarn size of 1.5 d to 7.0 d and a thermoplastic synthetic fiber B having single yarn size of 0.2 d to 1.5 d (Japanese Unexamined Patent Publication No. 8-325888).

As a vehicle is becoming lighter and more compact, an uncoated air bag is requested to be lighter and more compact. Manufacture of a compact, economical air bag fabric of low permeability and light METSUKE (mass) cannot be achieved by the conventional methods (1) to (4) for reasons such that even when the permeability is low under a low differential pressure condition, the pore size fluctuates at high differential pressure and, as a result, the permeability increases.

It is therefore an object of the invention to provide a light mass (METSUKE), compact, economical air bag fabric of low permeability.

Since an air bag has to rapidly develop at the time of a collision to protect the driver or an occupant, an uncoated air bag fabric is requested to have low permeability. In the latter period of development, it is demanded that the permeability increases in order to prevent abrasion on the face which occurs at the time of development.

A fabric satisfying such performance, however, cannot be obtained by the conventional techniques (1) to (4).

It is another object of the invention to provide an economical uncoated air bag fabric having a characteristic such that its permeability is low but becomes high at high differential pressure (40 kPa or higher) in the latter period of development.

SUMMARY OF THE INVENTION

The inventors of the present invention have found out that an uncoated air bag fabric of low permeability and light mass (METSUKE) can be obtained by controlling a pore distribution PD of pores made by fibers constructing the fabric and have achieved the present invention.

A compact and economical uncoated air bag fabric of low air permeability and light mass according to the first aspect of the invention has the following construction in order to solve the problems which cannot be achieved by the conventional methods. Specifically, the air bag fabric of the invention is made of thermoplastic fiber, wherein a distribution of pores formed by the fibers constructing the fabric, that is, a pore distribution is 2.0 or smaller and air permeability at differential pressure of 20 kPa is 2.5 (L/cm²/min) or lower.

The pore distribution is defined by the following equation 1.

$$PD = (FD\text{max} - FD\text{min})/FD\text{ave} \qquad \text{(Equation 1)}$$

where,

FDmax: maximum pore size ($\mu$m),
FDmin: minimum pore size ($\mu$m), and
FDave: average flow rate pore size ($\mu$m).

Specifically, the air bag fabric of the invention is characterized in that the crimp percentage of cloth formed by a thermoplastic fiber, the size of mono filament to the size of yarn and weaving density are adjusted and a proper shrinking process of is performed with heating, thereby controlling the pore distribution. The weaving density is preferably controlled by adjusting density and crimp percentage of gray fabric by controlling weaving condition. The pore distribution is preferably 1.9 or smaller. More preferably, the uncoated air bag fabric has air permeability of 1.4 (L/cm²/min) or lower.

According to the second aspect of the invention, there is provided an economical uncoated air bag fabric of which air permeability is low but increases under a high differential pressure condition in the latter period of development, which has the following constitution.

The air bag fabric of the invention is made of thermoplastic fiber, wherein a permeating deformation index (PI) of the thermoplastic fiber is in a range from 0.1 to 0.6 and air permeability of the fabric at differential pressure of 20 kPa is 1.0 (L/cm²/min) or lower.

The permeating deformation index PI is expressed by the following equation 2.

$$PI = M(3) \times (Den \times \rho/f)^{1/2} \quad \text{(Equation 2)}$$

M(3): tensile resistance value (g/d) of the fiber of fabric at 3% elongation
Den: denier (d) of the fiber constructing the fabric
f: the number of mono filaments in the yarn that constructing the fabric
ρ: density of thermoplastic fibers (g/cm³)

The uncoated air bag fabric of the invention is characterized in that the permeating deformation index of each of a warp and a weft which are obtained in a manner such that a thermoplastic fiber is woven to obtain cloth and the cloth is subjected to a shrinking process by being heated is adjusted to 0.1 to 0.6.

The permeating deformation index PI expresses the ratio of a tensile resistance value of the single yarn when the fiber is deformed slightly (3% elongation) to the surface area of the mono filament by an index by the equation 2. That is, by adjusting the balance between the diameter of the fiber used for the fabric and the elastic modulus of the fiber to which pressure is loaded, the uncoated air bag fabric having the properties as a target can be obtained. When the permeating deformation index is smaller than 0.1, the deformation of the fiber becomes large at the differential pressure of 20 kPa or lower. In association with it, the air permeability becomes high even at a relatively low differential pressure. When the permeating deformation index exceeds 0.6, the air permeability at the differential pressure of 50 kPa cannot be increased, so that it is unpreferable.

DETAILED DESCRIPTION OF THE PREFERRED EMBODIMENTS

Boiling water shrinkage percentage of a thermoplastic fiber as yarn used for an uncoated air bag fabric of the invention has to be 5 to 15%. When the boiling water shrinkage percentage of the yarn is lower than 5%, low permeability as a target cannot be obtained. When it is higher than 15%, the fabric after shrinkage becomes thick and looses compactness. Thus, it is not preferable. More preferable, the boiling water shrinkage percentage of the yarn is 8 to 12%.

Temperature of a heating process for performing a shrinking process is not especially limited but is usually 100 to 200° C. Preferably, it is suitable to perform a process at 160° C. or lower in order to obtain low permeability. An apparatus for performing a shrinking process is not limited to a heat setter, a boiling water bath, and the like. An apparatus capable of performing longitudinal and lateral overfeeding of about 2 to 15% is employed. In the invention, since it is necessary to adjust a permeating deformation index of fibers constructing the fabric to 0.1 to 0.6, facilities capable of adjusting it are properly selected and used.

The manner of weaving is not especially limited. When the uniformity of the base fabric property is considered, plain weaving is preferable. For example, an air-jet loom, a rapier loom, water-jet loom and the like are used for weaving but the invention is not especially limited to those.

Examples of thermoplastic fibers for constructing an air bag in the invention are aliphatic polyamide fibers such as nylon-6, nylon-6,6, nylon-4,6, and nylon-12 and polyester fibers such as polyethylene terephthalate and polybutylene terephthalate. The invention is not limited to the above. In consideration of cost efficiency and impact resistance, polyamide fibers such as nylon-6,6, nylon-4,6 and nylon-6 are especially preferable. There is no problem when various additives may be contained or given in the synthetic fibers in order to improve the flow in a yarn manufacturing process and a post process. Examples of the additives are oxidation inhibitor, heat stabilizer, smoother, anti-static agent, and flame retarder.

Preferably, the total size of each of the yarn to be used is 100 to 700 d and mono filament size is 8 d or smaller. More preferably, the total size of the yarn to be used is 150 to 420 d and the mono filament size is 4 d or smaller.

When the total size is smaller than 100d, the tensile strength and the tear strength of cloth are insufficient. When it exceeds 700 d, the flexibility of fabric is lost and it is disadvantageous from the viewpoint of foldability and it becomes difficult to satisfy the demand of compactness of the air bag.

Also in the case where the mono filament size exceeds 8 d, the flexibility of fabric is lost and it is disadvantageous from the viewpoint of foldability.

The air permeability in the invention is 2.5 L/cm²/min or lower at the differential pressure of 20 kPa. Preferably, it is 1.5 L/cm²/min or lower. More preferably, it is 1.0 L/cm²/min or lower. When the air permeability is higher than 2.5 L/cm²/min, the development of an uncoated air bag made of the fabric is not sufficient.

Preferably, the yarn is substantially not twisted or loosely twisted. More preferably, no-twisted yarn is used for the following reason. In the case of obtaining a fabric of low air permeability by using yarn of small single yarn size, when it is twisted, expansion of the single yarn is restricted and it becomes difficult to achieve low air permeability.

A difference between the crimp percentage in the longitudinal direction and that in the lateral direction of the fabric of the invention is, preferably, 4% or lower. When it is higher than 4%, the maximum pore size in the pore distribution becomes large and it is often difficult to obtain fabric of low air permeability. On the other hand, the crimp percentage of the invention is preferably 2 to 6% to make the pore distribution small but the invention is not limited to the percentage.

According to the first aspect of the invention, a light (low METSUKE), flexible and economical air bag fabric of low air permeability while holding mechanical characteristics necessary as the air bag fabric can be provided.

According to the second aspect of the invention, an economical uncoated air bag fabric of which air permeability is low but increases at the time of high pressure while holding mechanical characteristics necessary as the uncoated air bag fabric can be provided.

The invention will be described more precisely by the following examples. The physical properties in the examples were measured by the following manner.

METSUKE: measured following to JIS L1096 6.4.2
weaving density: measured following to JIS L1096 6.6
air permeability: measured by an air permeating amount measuring machine made by OEM system
bending resistance: measured following to JIS L1096 6.19.1.A method (45° cantilever method)
boiling water shrinkage percentage: measured following to JIS L1013 hot water shrinkage percentage B method 100° C.

3% tensile resistance value: tension test is conducted by using a tension tester at an initial load of 0.01 g/d and the tension at 3% elongation is measured air permeability value: air permeability when the differential pressure is 10, 20, 40 and 50 kPa is measured by using an air permeating amount measuring machine and air permeability value a/b (APEa/b) is calculated by the equation (3). The larger the air permeability value is, the higher the air permeability is.

$$APEa/b = \log(Pa/Pb)/\log(a/b) \quad \text{(Equation 3)}$$

Pa: air permeability (L/cm$^2$/min) measured at a (kPa)
Pb: air permeability (L/cm$^2$/min) measured at b (kPa)
APEa/b: air permeability value between akPa and bkPa (a>b)
pore distribution: measured using COULTER POROMETER II (COULTER ELECTRONICS LIMITED, ENGLAND)

Examples 1 to 3 and comparative examples 1 to 3 relate to the first aspect of the invention.

EXAMPLE 1

A plain weave fabric was made by a water-jet loom by using a no-twisted warp of 420 d/144 f (single yarn size of 2.9 d) having boiling water shrinkage percentage of 9.5% and a no-twisted weft of 420 d/144 f (single yarn size of 2.9 d) having boiling water shrinkage percentage of 9.5%. The overfeeding percentage adjustment and a shrinkage process was performed in the boiling water. Subsequently, the fabric was dried at 140° C., thereby adjusting so that the pore distribution value becomes 1.0. In such a manner, an uncoated air bag fabric was obtained. Table 1 shows the physical property evaluation result of the uncoated air bag fabric.

EXAMPLE 2

A plain weave fabric was made by a water-jet loom by using a no-twisted warp of 315 d/108 f (single yarn size of 2.9 d) having boiling water shrinkage percentage of 9.5% and a no-twisted weft of 315 d/108 f (single yarn size of 2.9 d) having boiling water shrinkage percentage of 9.5%. The overfeeding percentage adjustment water and a shrinkage process was performed in the boiling. Subsequently, the fabric was dried at 130° C., thereby adjusting so that the pore distribution value becomes 1.2. In such a manner, an uncoated air bag fabric was obtained. Table 1 shows the physical property evaluation result of the uncoated air bag fabric.

EXAMPLE 3

A plain weave fabric was made by a water-jet loom by using a no-twisted warp of 315 d/72 f (single yarn size of 4.4 d) having boiling water shrinkage percentage of 10.5% and a no-twisted weft of 315 d/72 f (single yarn size of 4.4 d) having boiling water shrinkage percentage of 10.5%. The overfeeding percentage was adjustment and a shrinkage process was performed in the boiling water. Subsequently, the fabric was dried at 140° C., thereby adjusting so that the pore distribution value becomes 1.8. In such a manner, an uncoated airbag fabric was obtained. Table 1 shows the physical property evaluation result of the uncoated air bag fabric.

Comparative Example 1

A plain weave fabric was made in a water-jet loom by using a no-twisted warp of 420 d/144 f (single yarn size of 2.9 d) having boiling water shrinkage percentage of 9.5% and a no-twisted weft of 420 d/144 f (single yarn size of 2.9 d) having boiling water shrinkage percentage of 9.5%. The overfeeding percentage was adjustment and a shrinkage process was performed in the boiling water. Subsequently, the fabric was dried at 160° C., thereby adjusting so that the pore distribution value becomes 2.1. In such a manner, an uncoated air bag fabric was obtained. Table 1 shows the physical property evaluation result of the uncoated air bag fabric.

Comparative Example 2

A plain weave fabric was made by a water-jet loom by using a no-twisted warp of 315 d/72 f (single yarn size of 4.4 d) having boiling water shrinkage percentage of 10.5% and a no-twisted weft of 315 d/72 f (single yarn size of 4.4 d) having boiling water shrinkage percentage of 10.5%. The overfeeding percentage was adjustment and a shrinkage process was performed in the boiling water. Subsequently, the fabric was dried at 180° C., thereby adjusting so that the pore distribution value becomes 2.4. In such a manner, an uncoated airbag fabric was obtained. Table 1 shows the physical property evaluation result of the uncoated air bag fabric.

Comparative Example 3

A plain weave fabric was made by a water-jet loom by using a no-twisted warp of 315 d/108 f (single yarn size of 2.9 d) having boiling water shrinkage percentage of 9.5% and a no-twisted weft of 315 d/108 f having boiling water shrinkage percentage of 9.5%. The overfeeding percentage was adjustment and a shrinkage process was performed in the boiling water. Subsequently, the fabric was dried at 170° C., thereby adjusting so that the pore distribution value becomes 2.2. In such a manner, an uncoated air bag fabric was obtained. Table 1 shows the physical property evaluation result of the uncoated air bag fabric.

As obviously understood from Table 1, the fabric of the invention has light mass (light METSUKE) and low air permeability.

Examples 4 to 6 and comparative examples 4 to 7 relate to the second aspect of the invention.

EXAMPLE 4

A plain weave fabric was made by using no-twisted yarn of 420 d/72 f (single yarn size of 5.8 d) having boiling water shrinkage percentage of 9.5% as warp and by using no-twisted yarn of 420 d/72 f having boiling water shrinkage percentage of 9.5% as weft. A shrinkage process was performed with boiling water. Subsequently, the fabric was dried at 140° C. and the gray fabric was set by shrinking the longitudinal size by 6.0% and shrinking the lateral size by 5.5%. In such a manner, an uncoated air bag fabric having a density of 55 pieces of yarn per inch in the longitudinal direction and a density of 55 pieces of yarn per inch in the lateral direction was obtained. Table 2 shows the physical property evaluation result of the uncoated air bag fabric.

EXAMPLE 5

A plain weave fabric was made by using no-twisted yarn of 420 d/72 f (single yarn size of 5.8 d) having boiling water shrinkage percentage of 10.0% as warp and no-twisted yarn of 420 d/72 f having boiling water shrinkage percentage of 6.0% as weft. A shrinking process was performed with boiling water. Subsequently, the fabric was dried at 130° C.

and the gray fabric was set by shrinking the longitudinal size by 5.5% and shrinking the lateral size by 4.0%. In such a manner, an uncoated air bag fabric having a density of 54 pieces of yarn per inch in the longitudinal direction and a density of 54 pieces of yarn per inch in the lateral direction was obtained. Table 2 shows the physical property evaluation result of the uncoated air bag fabric.

EXAMPLE 6

A plain weave fabric was made by using one kind of no-twisted yarn of 315 d/72 f (single yarn size of 4.4 d) having boiling water shrinkage percentage of 10.5% as warp and no-twisted yarn of 315 d/72 f (single yarn size of 4.4 d) having boiling water shrinkage percentage of 10.5% as weft. A shrinking process was performed with warm water of 90° C. Subsequently, the fabric was dried at 140° C. and the gray fabric was set by shrinking the longitudinal size by 7.5% and shrinking the lateral size by 6.5%. In such a manner, an uncoated air bag fabric having a density of 63 pieces of yarn per inch in the longitudinal direction and a density of 62 pieces of yarn per inch in the lateral direction was obtained. Table 2 shows the physical property evaluation result of the uncoated air bag fabric.

Comparative Example 4

A plain weave fabric was made by a loom by using no-twisted yarn of 420 d/72 f (single yarn size of 5.8 d) having boiling water shrinkage percentage of 6% as warp and one kind of no-twisted yarn of 420 d/72 f having boiling water shrinkage percentage of 6% as weft. A shrinking process was performed with boiling water. Subsequently, the fabric was dried at 150° C. Subsequently, the gray fabric was set by shrinking the longitudinal size by 6.0% and shrinking the lateral size by 6.0%. In such a manner, an uncoated air bag fabric having a density of 55 pieces of yarn per inch in the longitudinal direction and a density of 55 pieces of yarn per inch in the lateral direction was obtained. Table 2 shows the physical property evaluation result of the uncoated air bag fabric.

Comparative Example 5

A plain weave fabric was made by using no-twisted yarn of 315 d/72 f (single yarn size of 4.4 d) having boiling water shrinkage percentage of 10.5% as warp and no-twisted yarn of 315 d/72 f having boiling water shrinkage percentage of 10.5% as weft. A shrinkage process was performed with boiling water. Subsequently, the fabric was dried at 150° C. and the gray fabric was set by shrinking the longitudinal size by 10.0% and the lateral size by 10.0%. In such a manner, an uncoated air bag fabric having a density of 63 pieces of yarn per inch in the longitudinal direction and a density of 62 pieces of yarn per inch in the lateral direction was obtained. Table2 shows the physical property evaluation result of the uncoated air bag fabric.

Comparative Example 6

A plain weave fabric was made by using no-twisted yarn of 315 d/72 f (single yarn size of 4.4 d) having boiling water shrinkage percentage of 9.5% as warp and no-twisted yarn of 315 d/72 f having boiling water shrinkage percentage of 9.5% as weft. A shrinking process was performed with boiling water. Subsequently, the fabric was dried at 150° C. and the gray fabric was set by shrinking the longitudinal size by 6.0% and shrinking the lateral size by 3.2%. In such a manner, an uncoated air bag fabric having a density of 63 pieces of yarn per inch in the longitudinal direction and a density of 62 pieces of yarn per inch in the lateral direction was obtained. Table 2 shows the physical property evaluation result of the uncoated air bag fabric.

Comparative Example 7

A plain weave fabric was made by using no-twisted yarn of 420 d/72 f (single yarn size of 5.8 d) having boiling water shrinkage percentage of 6.0% as warp and no-twisted yarn of 420 d/72 f having boiling water shrinkage percentage of 6.0% as weft. A shrinking process was performed with boiling water. Subsequently, the fabric was dried at 150° C. and the gray fabric was set by shrinking the longitudinal size by 5.2% and the lateral size by 2.6%. In such a manner, an uncoated air bag fabric having a density of 53 pieces of yarn per inch in the longitudinal direction and a density of 53 pieces of yarn per inch in the lateral direction was obtained. Table 2 shows the physical property evaluation result of the uncoated air bag fabric.

As obviously understood from the results of Table 2, the uncoated air bag fabric of the invention is of low air permeability and has high air permeability value of 1.4 or higher (50/40: air permeability value in the period in which the differential pressure is from 50 kPa to 40 kPa), and the air permeability at the time of high pressure is higher as compared with the comparative examples.

TABLE 1

|  |  | Example | | | Comparative Example | | |
| --- | --- | --- | --- | --- | --- | --- | --- |
|  |  | 1 | 2 | 3 | 1 | 2 | 3 |
| size | longitudinal direction | 420d144f | 315d108f | 315d 72f | 420d144f | 315d 72f | 315d108f |
|  | lateral direction | 420d144f | 315d108f | 315d 72f | 420d144f | 315d 72f | 315d108f |
| boiling water | longitudinal direction | 9.5 | 9.5 | 10.5 | 9.5 | 10.5 | 9.5 |
| shrinkage percentage (%) of yarn | lateral direction | 9.5 | 9.5 | 10.5 | 9.5 | 10.5 | 9.5 |
| METSUKE (mass) after process (g/m$^2$) | | 210 | 177 | 185 | 221 | 192 | 183 |
| weaving density | longitudinal direction | 53 | 59 | 63 | 53 | 63 | 59 |
| (pcs/in) | lateral direction | 53 | 59 | 62 | 53 | 62 | 59 |
| crimp percentage (%) | longitudinal direction | 5.8 | 5.2 | 5.0 | 8.6 | 7.6 | 8.8 |
|  | lateral direction | 3.2 | 3.6 | 3.5 | 2.3 | 1.9 | 1.6 |
| bending resistance | longitudinal direction | 78 | 72 | 82 | 76 | 80 | 70 |
| (mm) | lateral direction | 110 | 95 | 105 | 120 | 112 | 105 |
| air permeability (L/cm$^2$/min) | | 0.5 | 0.5 | 0.7 | 1.6 | 2.2 | 2.1 |
| pore distribution | | 1.0 | 1.2 | 1.3 | 2.1 | 2.4 | 2.2 |

TABLE 2

|  |  | Example | | | Comparative Example | | | |
|---|---|---|---|---|---|---|---|---|
|  |  | 4 | 5 | 6 | 4 | 5 | 6 | 7 |
| size | longitudinal direction | 420d 72f | 420d 72f | 315d 72f | 420d 72f | 315d 72f | 315d 72f | 420d 72f |
|  | lateral direction | 420d 72f | 420d 72f | 315d 72f | 420d 72f | 315d 72f | 315d 72f | 420d 72f |
| boiling water shrinkage percentage (%) of yarn | longitudinal direction | 9.5 | 10.0 | 10.5 | 6.0 | 10.5 | 9.5 | 6.0 |
|  | lateral direction | 9.5 | 6.0 | 10.5 | 9.5 | 10.5 | 9.5 | 6.0 |
| shrinkage percentage (%) of gray fabric after process | longitudinal direction | 6.0 | 5.5 | 7.5 | 6.0 | 10.0 | 6.1 | 5.2 |
|  | lateral direction | 5.5 | 4.0 | 6.5 | 6.0 | 10.0 | 3.2 | 2.6 |
| weaving density (pcs/in) | longitudinal direction | 55 | 54 | 63 | 55 | 63 | 63 | 53 |
|  | lateral direction | 55 | 54 | 62 | 55 | 62 | 62 | 53 |
| permeating deformation index | longitudinal direction | 0.16 | 0.18 | 0.16 | 0.09 | 0.07 | 0.15 | 0.16 |
|  | lateral direction | 0.48 | 0.42 | 0.46 | 0.32 | 0.10 | 0.68 | 0.27 |
| air permeability (L/cm²/min) |  | 0.7 | 0.8 | 0.8 | 0.9 | 1.2 | 0.9 | 1.5 |
| air permeability value | 20/10 | 1.0 | 1.1 | 1.0 | 1.2 | 1.2 | 1.1 | 0.9 |
|  | 50/40 | 1.5 | 1.4 | 1.6 | 1.3 | 1.2 | 1.0 | 1.0 |

What is claimed is:

1. A method of producing a woven uncoated air bag fabric comprising:
   (a) providing an original yarn of a thermoplastic fiber that has a single yarn size of 8 d or lower, a total yarn size of 100 to 700 d, and a boiling water shrinkage percentage of 5 to 15%,
   (b) weaving the thermoplastic fiber to form a woven fabric, and
   (c) subjecting the woven fabric to a shrinkage treatment under adjustment of an overfeeding percentage in order to provide the woven uncoated air bag fabric with a pore distribution value (PD) expressed by equation (1) of pores formed in the thermoplastic fiber is 2.0 or smaller, and air permeability at differential pressure of 20 kPa is 2.5 (L/cm²/min) or lower, wherein $$PD = (FDmax - FDmin)/FDave \quad \text{(Equation 1)}$$

FDmax: maximum pore size ($\mu$m)
   FDmin: minimum pore size ($\mu$m)
   FDave: average flow rate pore size ($\mu$m).

2. The method according to claim 1, wherein the thermoplastic fiber comprises a polyamide.

3. The method according to claim 1, wherein the thermoplastic fiber comprises a polyester.

4. The method according to claim 1, wherein subjecting the woven fabric to a shrinkage treatment under adjustment of an overfeeding percentage comprises subjecting the woven fabric to an apparatus that performs longitudinal and lateral overfeeding of about 2 to about 15%.

5. The method according to claim 4, wherein the thermoplastic fiber comprises a polyamide.

6. The method according to claim 4, wherein the thermoplastic fiber comprises a polyester.

7. The method according to claim 1, wherein the difference between crimp percentage of the fabric in the longitudinal direction and that in the lateral direction is 4% or lower after the shrinkage treatment.

8. The method according to claim 7, wherein the thermoplastic fiber comprises a polyamide.

9. The method according to claim 7, wherein the thermoplastic fiber comprises a polyester.

10. The method according to claim 7, wherein subjecting the woven fabric to a shrinkage treatment under adjustment of an overfeeding percentage comprises subjecting the woven fabric to an apparatus that performs longitudinal and lateral overfeeding of about 2 to about 15%.

11. The method according to claim 10, wherein the thermoplastic fiber comprises a polyamide.

12. The method according to claim 10, wherein the thermoplastic fiber comprises a polyester.

13. A method of producing a woven uncoated air bag fabric comprising:
   (a) providing an original yarn of a thermoplastic fiber that has a single yarn size of 8 d or lower, a total yarn size of 100 to 700 d, and a boiling water shrinkage percentage of 5 to 15%,
   (b) weaving the thermoplastic fiber to form a woven fabric, and
   (c) subjecting the woven fabric to a shrinkage treatment under adjustment of an overfeeding percentage in order to provide the woven uncoated air bag fabric with a permeating deformation index (PI) expressed by equation (2) of the thermoplastic fiber in a range from 0.1 to 0.6, and air permeability of the fabric at differential pressure of 20 kPa is 1.0 (L/cm²/min) or lower, wherein $$PI = M(3) \times (Den \times \rho/f)^{1/2} \quad \text{(Equation 2)}$$

M(3): tensile resistance value (g/d) of the fiber of the fabric at 3% elongation
   Den: denier (d) of the fiber constructing the fabric
   f: the number (pcs) of mono filaments of multi filaments constructing the fabric
   $\rho$: density of thermoplastic fiber (g/cm³).

14. The method according to claim 13, wherein the thermoplastic fiber comprises a polyamide.

15. The method according to claim 13, wherein the thermoplastic fiber comprises a polyester.

16. The method according to claim 13, wherein subjecting the woven fabric to a shrinkage treatment under adjustment of an overfeeding percentage comprises subjecting the woven fabric to an apparatus that performs longitudinal and lateral overfeeding of about 2 to about 15%.

17. The method according to claim 16, wherein the thermoplastic fiber comprises a polyamide.

18. The method according to claim 16, wherein the thermoplastic fiber comprises a polyester.

19. The method according to claim 13, wherein the difference between crimp percentage of the fabric in the longitudinal direction and that in the lateral direction is 4% or lower after the shrinkage treatment.

20. The method according to claim 19, wherein the thermoplastic fiber comprises a polyamide.

21. The method according to claim 19, wherein the thermoplastic fiber comprises a polyester.

22. The method according to claim 19, wherein subjecting the woven fabric to a shrinkage treatment under adjustment of an overfeeding percentage comprises subjecting the woven fabric to an apparatus that performs longitudinal and lateral overfeeding of about 2 to about 15%.

23. The method according to claim 22, wherein the thermoplastic fiber comprises a polyamide.

24. The method according to claim 22, wherein the thermoplastic fiber comprises a polyester.

* * * * *